United States Patent [19]

Roethke

[11] 4,142,289
[45] Mar. 6, 1979

[54] COIL WINDER

[75] Inventor: Alfred A. K. Roethke, Menomonee Falls, Wis.

[73] Assignee: Ameco Corporation, Menomonee Falls, Wis.

[21] Appl. No.: 859,061

[22] Filed: Nov. 21, 1977

[51] Int. Cl.² .......................................... H02K 15/08
[52] U.S. Cl. ....................................... 29/736; 29/605; 29/747; 140/92.1; 242/7.11; 242/7.14
[58] Field of Search ............... 29/736, 747, 759, 761, 29/605; 140/92.1, 1; 242/7.11, 7.14

[56] References Cited

U.S. PATENT DOCUMENTS

| 3,098,990 | 7/1963 | Farrand et al. | 29/605 |
| 3,228,615 | 1/1966 | Lancaster | 29/605 X |
| 3,658,269 | 4/1972 | Giuseppe | 140/92.1 X |
| 4,074,418 | 2/1978 | Pearsall | 29/736 X |

Primary Examiner—Carl E. Hall
Attorney, Agent, or Firm—Henry C. Fuller

[57] ABSTRACT

Coil winding apparatus includes wire tap pulling needles with the needles for pulling taps on each side of the bobbin mounted on separate mounting plates with a quick change cam mechanism and springs for spacing the plates and thus the needles to accommodate coil bobbins of different sizes with terminals at different spacings. The apparatus also includes wire feed means for clamping the wire between the winding flyers and the wire supply rolls to advance the wire at a rate greater than required by the flyer to make a winding to provide slack in the wire just prior to retraction of the tap pull needles so that the wire does not break or stretch during the tap pulling sequence.

6 Claims, 13 Drawing Figures

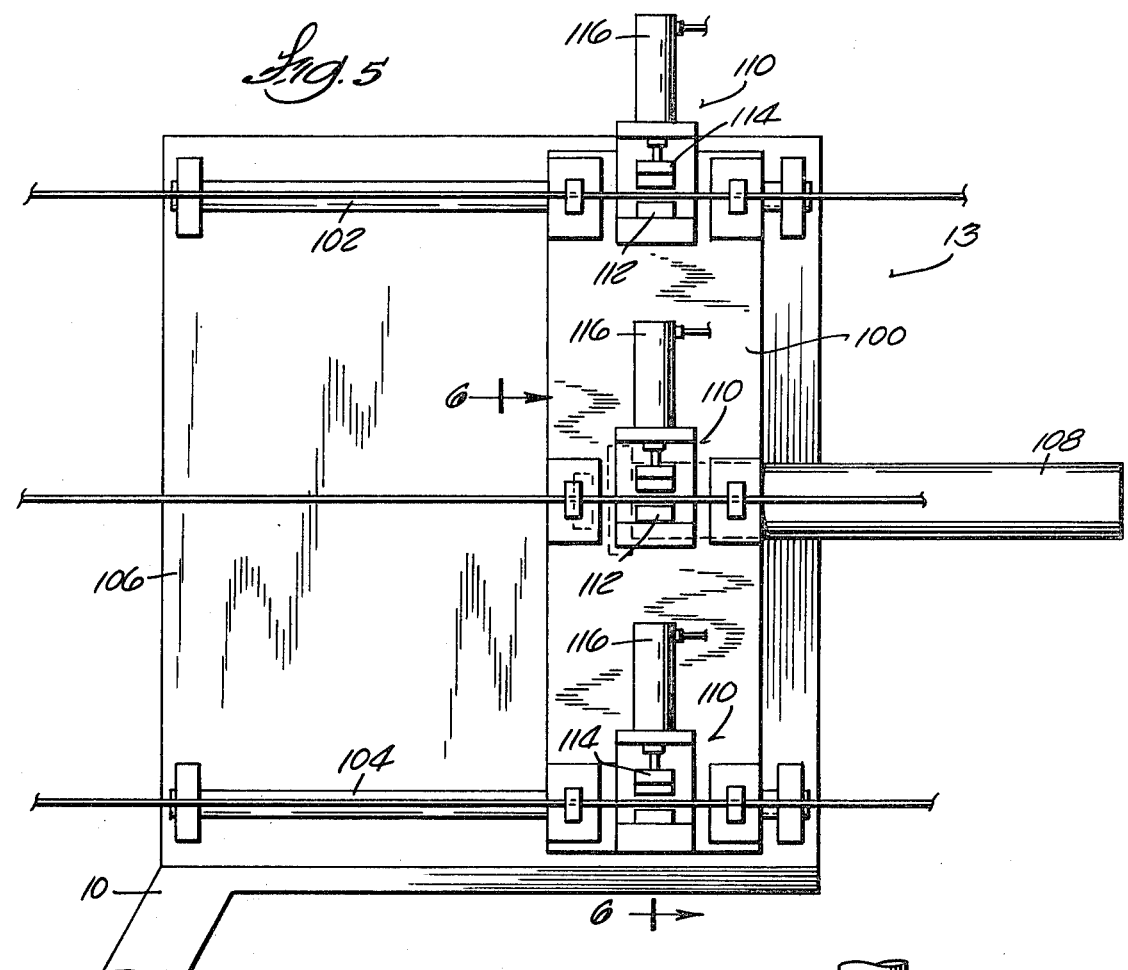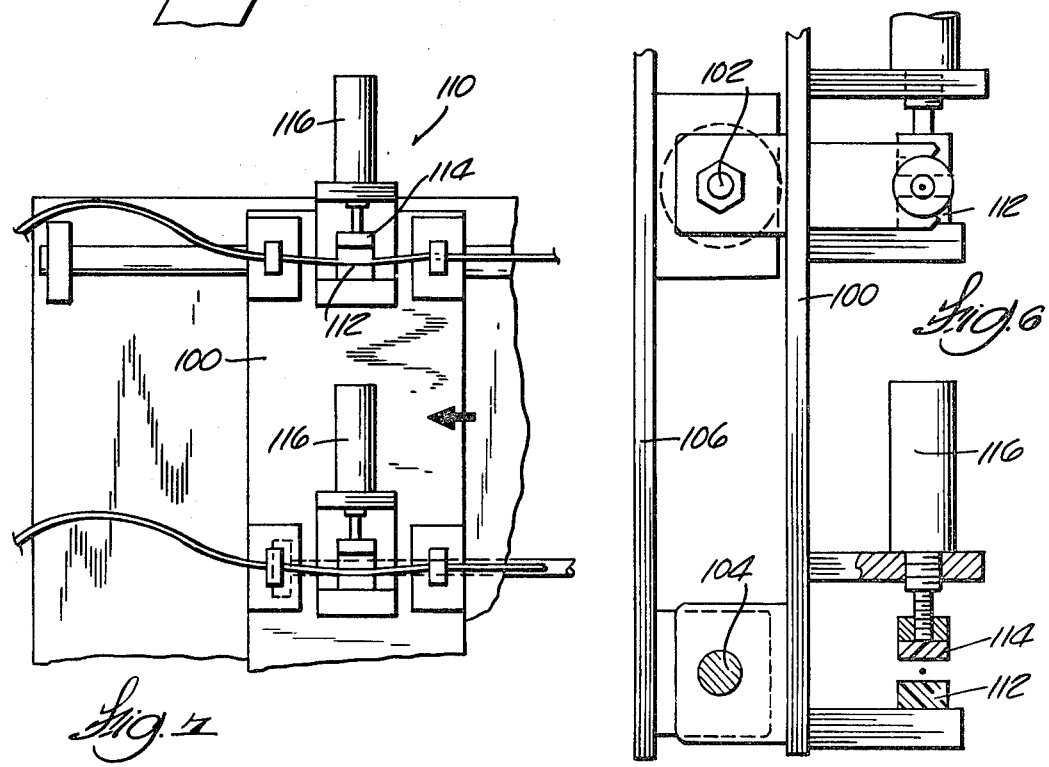

COIL WINDER

BACKGROUND OF INVENTION

In coil winding machines having tap pull needles to pull wire taps intermediate the starting and finishing windings, breakage or stretching of the wire can occur during the tap pulling sequence in which wire loops are pulled through the bobbin terminals.

SUMMARY OF INVENTION

The invention provides positive feed means for feeding the wire to provide slack in the wire just prior to the pulling of the taps by tap pull needles so that there is no tension on the wire during the tap pulling sequence to eliminate wire breakage. In this regard, a horizontally reciprocatable carriage is provided which is operated by a hydraulic or pneumatic cylinder. Wire clamps are supported on the carriage and are actuated by other power cylinders mounted on the carriage. The carriage cylinder and clamping cylinders are operated in a sequence so that the carriage is moving at the time the clamp is actuated to grip the wire. Thus the wire is gripped on the fly to minimize tension between the clamp and the rotating flyers to minimize breakage. When the wire is gripped, the carriage moves at a rate faster than the winding rate of the wire on the bobbin to provide a loop of slack wire between the wire feed carriage and the flyer. The slack wire is then drawn through the appropriate bobbin terminal by a tap pull needle.

The invention also provides quick change cam means for adjusting the spacing of the mounting plates which carry the tap pull needles and the mechanism for reciprocating the tap pull needles so that the tap pull needles have the appropriate lateral spacing for coils of different size with a different terminal spacing.

Further objects, advantages and features of the invention will become apparent from the disclosure.

DESCRIPTION OF DRAWINGS

FIG. 5 is a side elevational view of the wire feed clamp carriage.

FIG. 6 is a view taken along the line 6—6 of FIG. 5.

FIG. 7 is a fragmentary view of the wire feed carriage shown in FIG. 5 with the wire clamp actuated.

DESCRIPTION OF PREFERRED EMBODIMENT

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Figure 1:
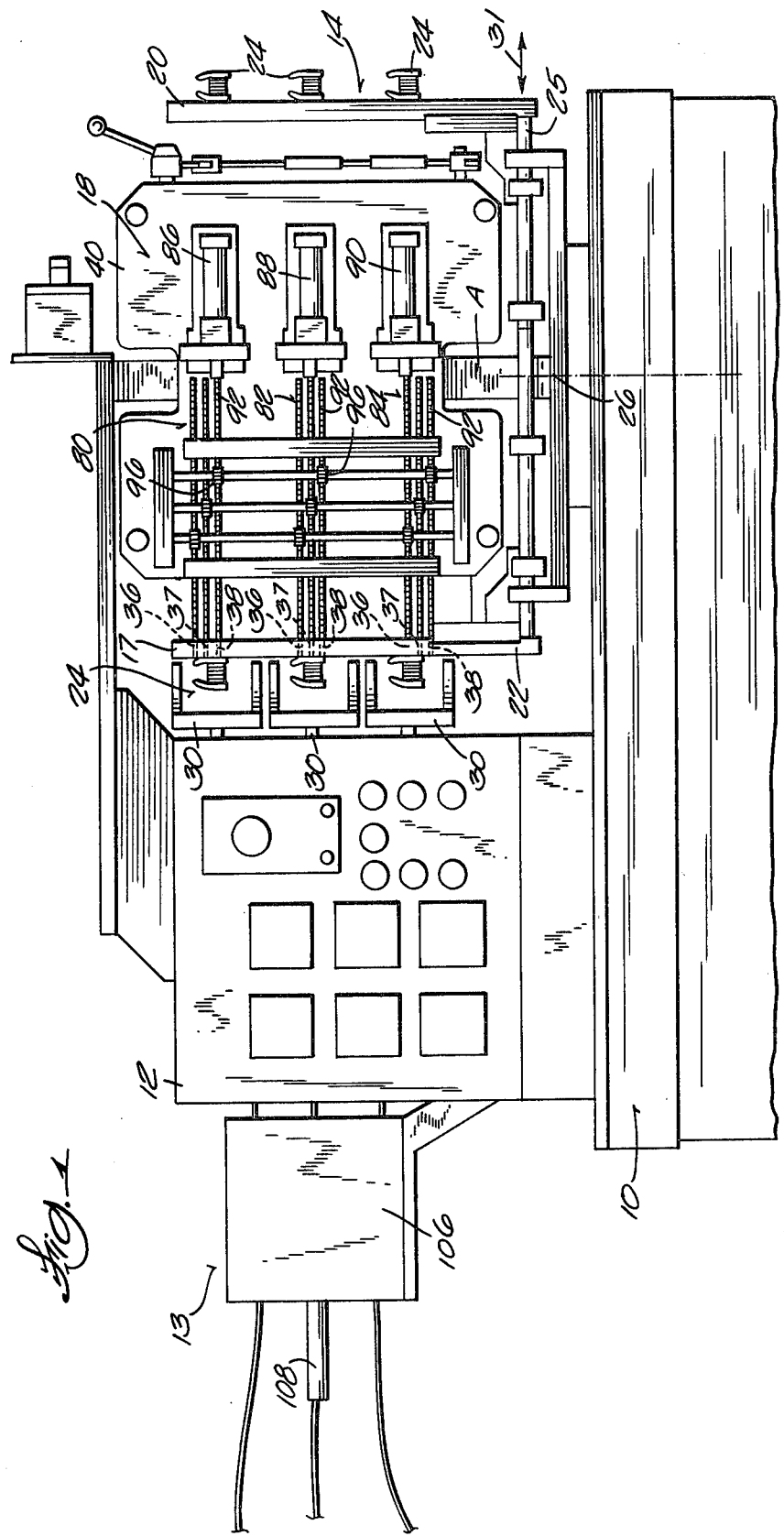
FIG. 1 is a side elevational view of coil winding apparatus in accordance with the invention.

In the drawings, FIG. 1 shows the coil winding apparatus of the invention which includes a machine frame 10. The frame 10 supports a control panel 12 and the tap pull wire feed assembly 13 (FIG. 5) and the stator carousel 14 and tap pull needle assemblies 17 and tap pull needle reciprocating means 18. The carousel 14 is provided with two stator holding bars 20 and 22. In the disclosed construction, each stator bar 20, 22 is adapted to hold three stators 24. The stator bars 20 and 22 are supported and interconnected by a frame 26 which is swingable about an axis A (FIG. 1). Stator mounting bar 20 is in the loading and unloading position where the operator removes wound stators and loads unwound stators. Stator mounting bar 22 is in the winding position where three stators or bobbins are simultaneously wound by three separate flyers 30. The operator of the machine manually flips the stator bars 20, 22 to the desired positions for the appropriate steps. The stator bars 20 and 22 are mounted on bars 25 which are reciprocated horizontally along the path illustrated by arrow 31 to move the bobbins horizontally back and forth within the flyers 30 to level wind layers of wire as subsequently described. The stator bar carousel assembly and the mechanism for reciprocating the stator bars 20, 22 in the direction of arrow 31 are conventional in coil winding apparatus.

Figure 2:
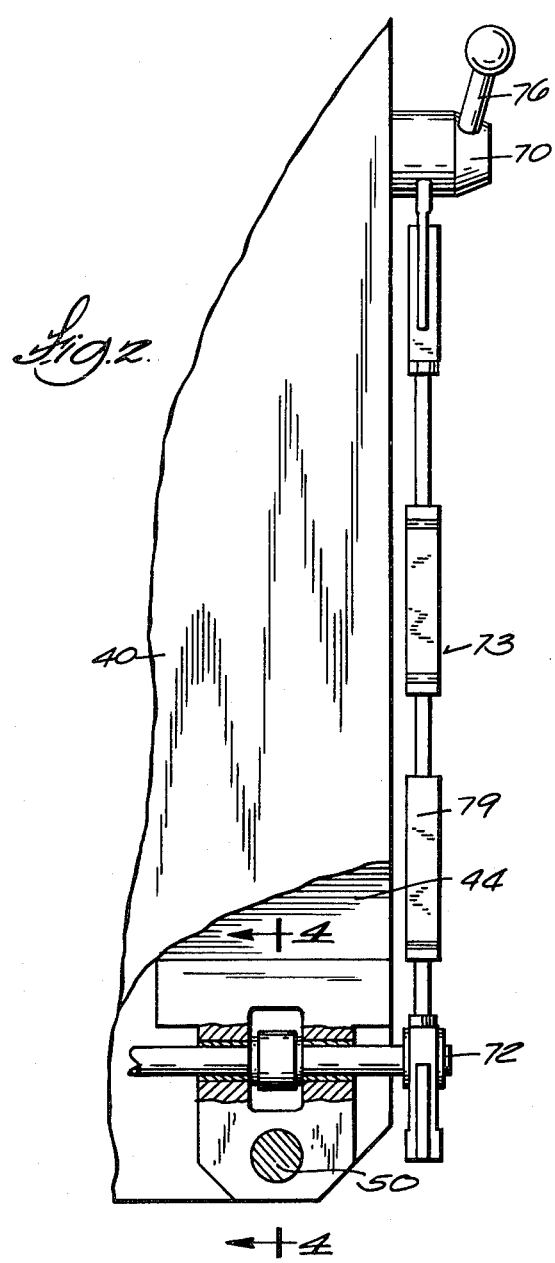
FIG. 2 is an enlarged fragmentary side view taken along the right side of FIG. 1.
Figure 13:
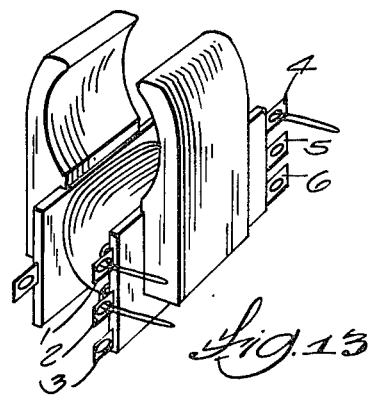
FIG. 13 is a perspective view of a coil with bobbin terminals of the type wound by the apparatus of the invention.

Tap pull needle assemblies 17 are provided for pulling one or more wire taps intermediate the start and finish windings on the bobbins through the bobbin terminals. FIG. 13 illustrates a bobbin with six terminals, 1 through 6, with three terminals on each side of the bobbin. As disclosed in FIG. 1, three tap pull needles 36, 37 and 38 are provided for each side of each bobbin. Thus a total of six taps can be pulled with the disclosed apparatus. The needle assemblies 17 are mounted on mounting plates 40 and 42 (FIG. 3) at opposite sides of an upstanding intermediate plate 44 which is fixed to the machine frame 10. The plates 40 and 42 are supported on upper and lower cross shafts 48 and 50 (FIGS. 1, 2 and 3) for movement between the spaced separated position shown in FIG. 3 and a collapsed position flush against the intermediate fixed plate 44. Springs 60 and 62 urge the plates 40 and 42 to the collapsed position against the intermediate plate 44. The adjustment of the spacing of the plates 40 and 42 is provided by cams 66 and 68 fixed on shafts 70 and 72. The shafts 70, 72 are rotatably supported on plate 44. A hand crank 76 is fixed to shaft 70 and connected by a linkage 73 to shaft 72. The linkage 73 can include turnbuckles 79 for adjustment. Manual manipulation of the cams 66, 68 by the crank 76 provides the desired spacing of the plates 40, 42 and thus the desired spacings of the tap pull needles supported on each of the plates 40 and 42 so that the tap pull needles will register with the spaced terminals 1 and 4 et al. (FIG. 13). The foregoing arrangement provides for quick change of the needle spacing when changing over to different size bobbins.

Figure 3:
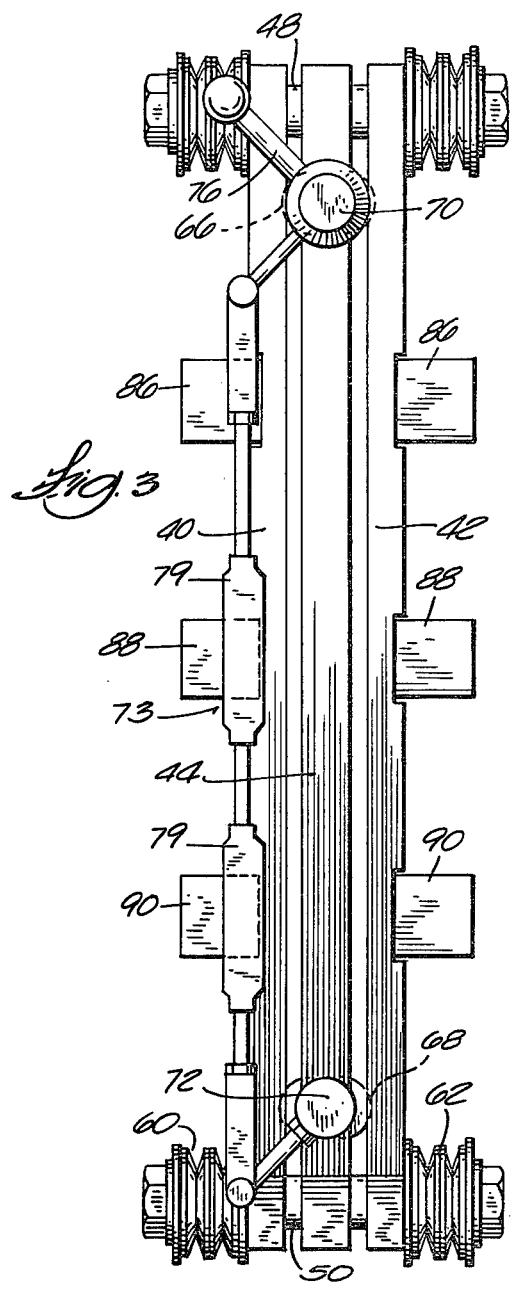
FIG. 3 is an enlarged end view of the apparatus shown in FIGS. 1 and 2.
Figure 4:
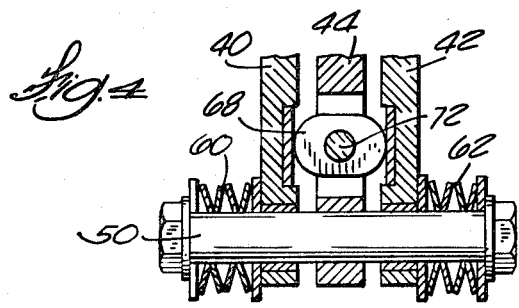
FIG. 4 is a sectional view taken along the line 4—4 of FIG. 2.

As illustrated in FIG. 1, plate 40 is provided with three groups 80, 82 and 84 of gear racks. Plate 42 is similarly provided with gear racks. Each gear rack is provided with a tap pulling needle. The racks are vertically spaced in each group so that the needles will register with terminals 1, 2 and 3 (FIG. 13) of the bobbin. Each gear rack assembly 80, 82 and 84 can pull three taps on each side of a bobbin. Means are provided for advancing and retracting the needles. In the disclosed construction, the means comprises three pneumatic or three hydraulic power cylinders 86, 88 and 90 supported on each plate 40, 42 (FIGS. 1, 3). Power cylinder 86 is connected to a gear rack 92. Advancing or retracting movement of gear rack 92 is transmitted to the gear racks 92 in the other groups 82 and 84 by a cross shaft 94 provided with meshing gears 96. Thus upon actuation of cylinder 86, the three gear racks 92 simultaneously and as a unit advance and retract under the influence of power cylinder 86. The other cylinders 88 and 90 are similarly connected to other gear racks and transmit advancing and retracting motion. Accordingly, three wire taps (one for each of three bobbins) can be pulled simultaneously by actuation of a single power cylinder.

In accordance with the invention, there is provided means for positively feeding the wire during the tap pulling sequence to provide slack in the wire to prevent breakage or stretching of the wire when the needles pull the wire through the terminals on the bobbin. In the disclosed construction, the wire feed assembly 13 includes a carriage 100 (FIG. 5) which is reciprocatable horizontally along guides 102 and 104. The guides are mounted on a plate 106 which is fixed to the frame 10. The carriage 100 is reciprocated by a power cylinder 108.

The carriage 100 contains wire clamp assemblies 110 for each of the three bobbins being simultaneously wound. Each clamp assembly 110 includes a fixed jaw 112 and a movable jaw 114. The movable jaws 114 are connected to power cylinder assemblies 116. As illustrated in FIG. 7, all three wire clamps are simultaneously actuated during movement of the carriage 100 as hereinafter described.

Figure 9:
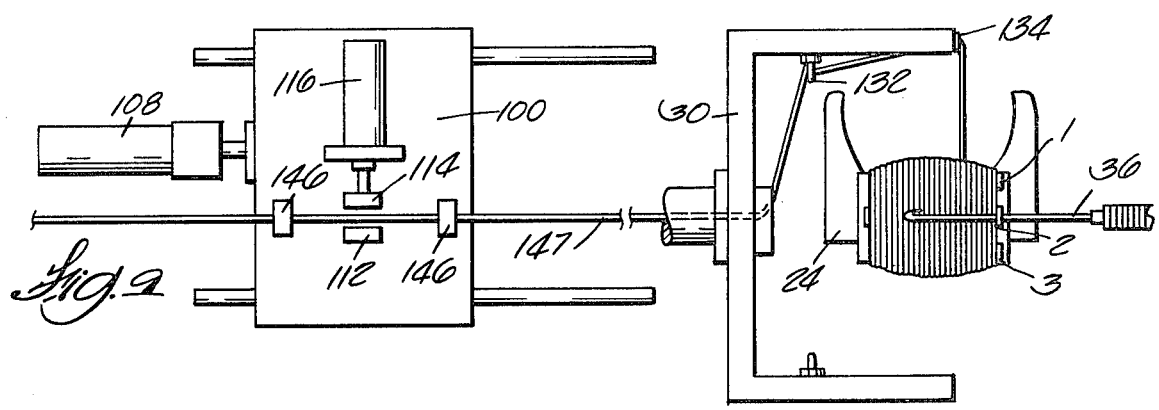
FIGS. 9 through 12 are sequential views showing the tap pulling sequence.
Figure 10:
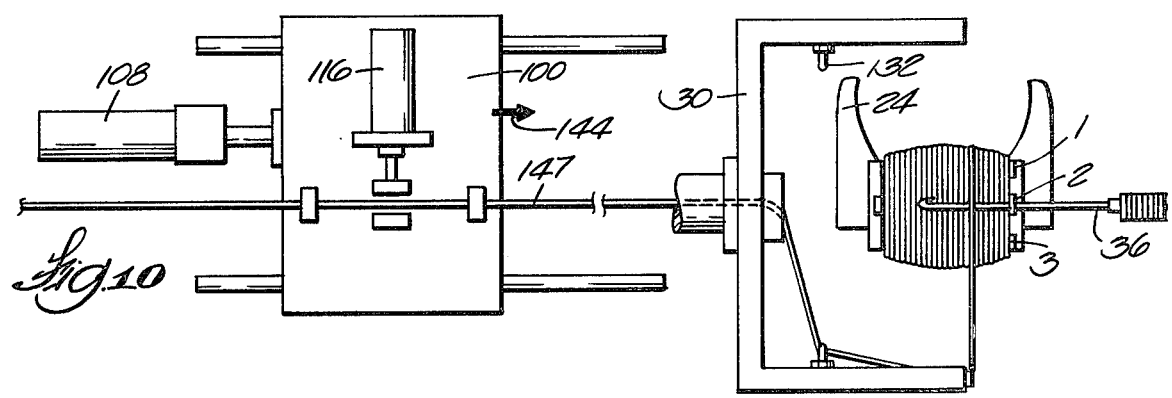
Figure 11:
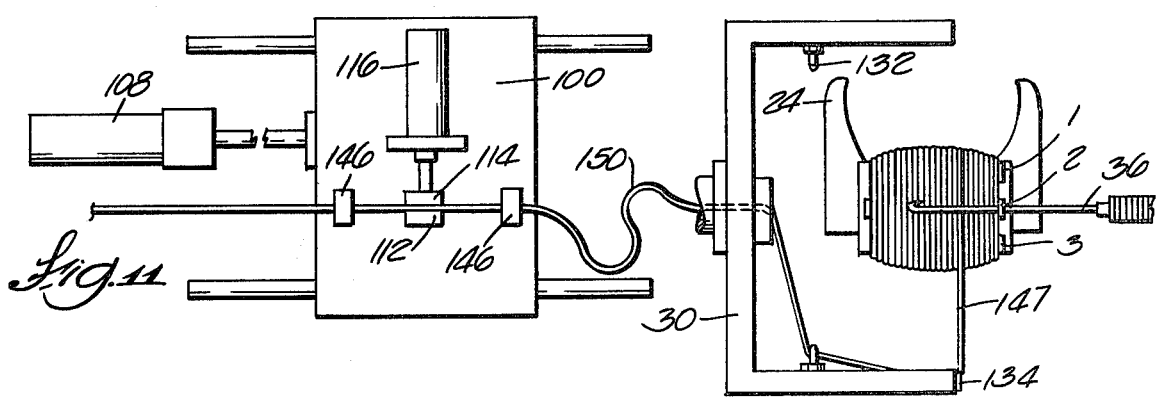
Figure 12:
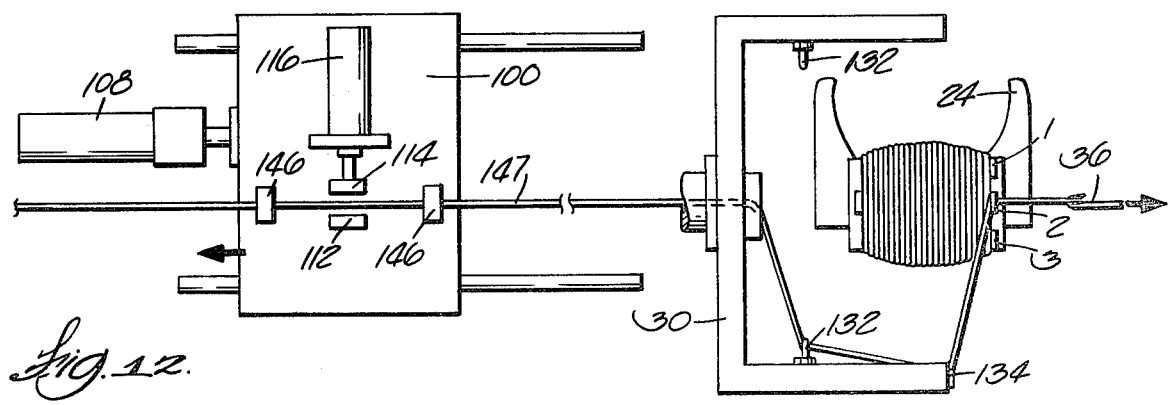

FIGS. 9 through 12 illustrate the sequential operation of the wire feed clamps and needle tap pulling assemblies. As illustrated in FIG. 9, the flyer 30 is provided with eyelets 132 and 134 which feed the wire to the bobbin. In FIG. 9, a needle 36 has been advanced through terminal 2 of the bobbin to commence a tap pulling sequence. The carriage 100 is in the retracted position. In FIG. 10, the carriage 100 has commenced movement in the direction of arrow 144 while the flyer 30 has made a partial revolution. In FIG. 10, the flyer 30 is continuing to rotate and is withdrawing wire through the wire guides 146 on the carriage 100. While the carriage 100 is moving, the cylinders 116 are actuated to move the movable jaws 114 and grip the wire 147 on the fly. The carriage 100 is moving at a rate faster than the wire 147 is being withdrawn by the flyer and wrapped around the bobbin. Thus the continued movement of the carriage 100 after the wire clamps have gripped the wire 147 causes a loop 150 of wire to form as illustrated in FIG. 11. Once the loop of wire slack 150 is formed in the wire, the tap pull needle 36 retracts and pulls the slack wire through the terminal 2 as illustrated in FIG. 12. The cylinder 116 is reversed to unclamp the wire before the tap pulling sequence is completed, and the carriage 100 returns to the retracted position under influence of cylinder 108 to await the next tap pulling cycle.

Figure 8:
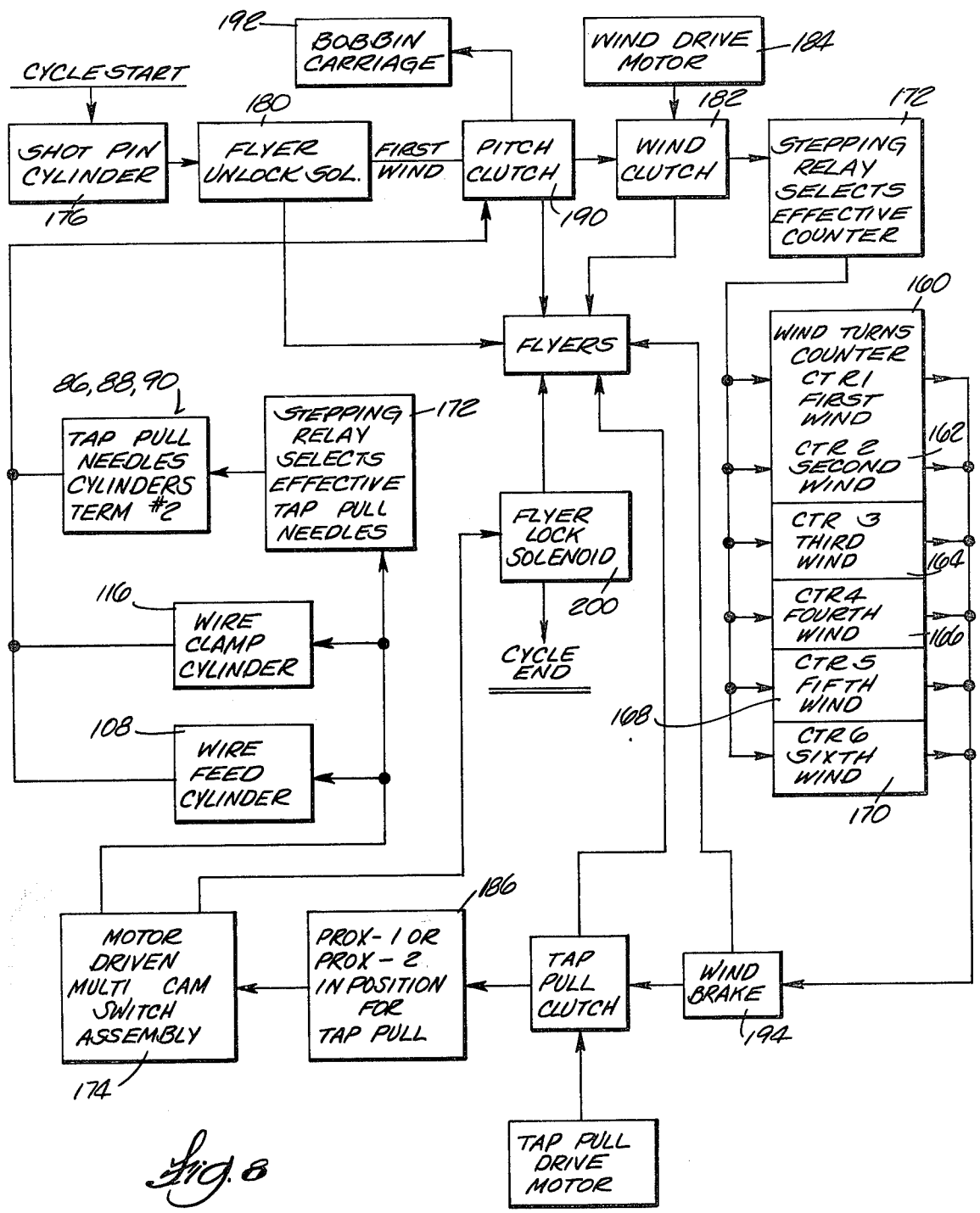
FIG. 8 is a diagrammatic view of the circuit components and mechanism for operating the coil winding apparatus.

FIG. 8 diagrammatically illustrates the circuits, circuit components and the interaction of the components employed to accomplish the coil winding and tap pulling sequence. The components include six counters 160, 162, 164, 166, 168 and 170. Counter 170 is preset for the total number of turns desired on the bobbin. When the selected total number of turns is attained, counter 170 stops the winding operation. The other counters are pre-set to activate the other components to pull taps at desired intervals between the start and finish winding or turns. With six counters, one for the final or total number of turns enables pre-setting five individual counters for five separate taps at different intervals. A stepping relay 172 controls the entire winding sequence and selects the appropriate counter which is to control the next tap pulling sequence. A motor driven multi-cam switch assembly 174 controls each individual tap pulling sequence.

The cycle of winding a coil is started by actuation of a shot pin cylinder 176 to release the frame 26 so that a bar 20 or 22 can be manually indexed to the winding position with three bobbins positioned to be wound simultaneously. A flyer unlock solenoid 80 releases the flyers 30 so that the rotating flyers 30 can withdraw wire from three parent rolls of wire and wind the wire around the bobbins. This is accomplished by actuation of the wind clutch 182 which couples the wind drive motors 184 which drive the flyers 30. The wind drive motors 184 desirably include fast and slow speed motors with a fast speed motor providing winding at approximately 3,000 rpm. The slow speed motor provides a rotation of the flyers 30 at about 50 rpm during the tap pulling sequence.

Once the winding sequence has commenced, the stepping relay selects the counter which has been preset for the first tap pull after a pre-selected number of turns.

Two proximity switches 186 which sense the position of the flyer shafts and thus the flyer are employed. One of the proximity switches senses position of the flyer for the bobbin terminals 1, 2 and 3, and the other senses position of the flyer for pulling taps for terminals 4, 5 and 6. The stepping relay selects the appropriate proximity switch for the particular terminals on the side of the bobbin through which a wire loop or tap is going to be pulled. For instance, a proximity switch senses the position of the flyer 30 in FIG. 9 and prior to movement of the flyer to the position in FIG. 10 causes the needle to advance so that the wire 147 is wrapped over the needle 36.

The selected proximity switch 186 cycles the cam switch 134 which actuates in sequence the wire feed cylinder 108, the wire clamp cylinder 116 and the pitch clutch 190 which controls the position of the bobbin carriage 192 which reciprocates the bobbin in a horizontal path to cause level winding of wire on the bobbin. When the pitch clutch 192 is disengaged, a spring (not shown) returns the bobbin carriage to the position shown in FIG. 10 so that the tap pulling occurs with a winding adjacent rather than remote from the bobbin terminals. The wind brake 194 stops high speed rotation of the flyers 30 and the wind clutch engages the slow drive for the flyers during the tap pulling sequence.

The selected tap pull needle cylinder is actuated to extend the tap pull needle through the appropriate terminal. As the tap pull needle 36 is advanced, the wire feed carriage 100 is activated and advances the carriage 100. The wire clamp cylinders 116 are actuated after movement of the carriage commences to grip the wires 147 on the fly. Continued movement of the carriage 100 forms the slack wire loops 150 illustrated in FIG. 11. The tap pull needles are then retracted to pull the wire through the selected terminal as illustrated in FIG. 12. As the tap pull needles are retracting, the wire clamp jaws are opened. The slack wire enables pulling of the wire without stretching the wire or breaking the wire during the tap pulling sequence.

The motor driven cam switch assembly also advances the stepper relay to select the next effective counter for the next wire tap pulling sequence. When the next selected counter senses the number of turns for the next tap pull, the sequence is again accomplished to pull another tap. After the final turn is sensed by counter 170, a flyer lock solenoid 200 locks the flyers in an upright position so that the flyers clear the bobbins when the frame 26 is indexed to remove the wound bobbins and position unwound bobbins in the winding position.

What is claimed is:

1. A coil winding apparatus for winding wire on a bobbin having terminals, said apparatus comprising a frame, a stator holder supported on said frame, a rotating winding flyer supported on the frame, tap pulling needles, means on said frame for reciprocating said needles through bobbin terminals into and from wire tap pulling position, motor means to rotate the flyer at first and second speeds, with said second speed being slower than the first speed, wire feed means supported on said frame to positively feed the wire from a supply roll, and control circuit means to operate said flyer motor means, said wire feed means and said means for reciprocating the wire pull needles in a timed sequence at a pre-selected number of wire turns on the bobbin so that said flyer motor means causes rotation of said flyer at slow speed and said tap pull needle advances through a bobbin terminal to a wire engaging position during rotation of said flyer at slow speed, and said wire feed means forming a loop of slack wire between the bobbin and the wire supply prior to retraction of said wire tap needle, and retraction of said wire pull needle to draw the slack wire through one of said bobbin terminals before said flyer completes a revolution.

2. The improvement of claim 1 wherein said wire feed means to positively feed the wire includes a movable carriage, carriage motor means to reciprocate the carriage, and said carriage including means for clamping the wire when the wire is moving to advance the wire and form a wire loop of slack wire and to unclamp the wire at a pre-selected time interval after sufficient wire slack is formed to pull a wire tap.

3. The improvement of claim 2 wherein said means for clamping said wire includes a fixed jaw and a movable jaw, and a power cylinder supported on said carriage and connected to said movable jaw.

4. In a coil winding apparatus including a bobbin carrier for supporting a plurality of bobbins in a winding position with respect to winding flyers, tap pull needle assemblies for each of the bobbins for advancing and retracting tap pull needles along a first axis through terminals on the bobbins, and tap pull needle motor means for advancing and retracting said tap pull needles, said means including power transfer means to couple each of said motor means to a group of needle assemblies so that each needle assembly in the group is advanced and retracted in concert by actuation of a single motor.

5. The coil winding apparatus of claim 4 wherein said motor means comprises power cylinders, said cylinders having piston rods connected to racks, said racks being connected to said needle assemblies to move said needle assemblies along a first axis, and said means to couple said motor means to a group of racks comprising a plurality of cross shafts carrying gear means in mesh with said racks so that actuation of a power cylinder connected to one of said racks will cause movement of the other needle assemblies in the group.

6. The coil winding apparatus of claim 5 wherein there are needle assemblies for the terminals on each side of the bobbin and the needle assemblies for each side of the bobbin are supported on separate carrier plates, means for supporting said carrier plates for movement along a second axis at right angles to the first axis of movement of said needle assemblies, and biasing means to urge said carrier plates to a first position along said second axis, and a cam located between said carrier plates, said cam having two lobes, and crank means connected to said cam to shift said cam and urge said carrier plates to a second position along said second axis, with said needles and said carrier plates at a greater spacing than in said first position to locate said tap pull needles on said carrier plates at a greater spacing to accommodate a greater terminal spacing between terminals on opposite sides of the bobbins.

* * * * *